Patented Feb. 26, 1952

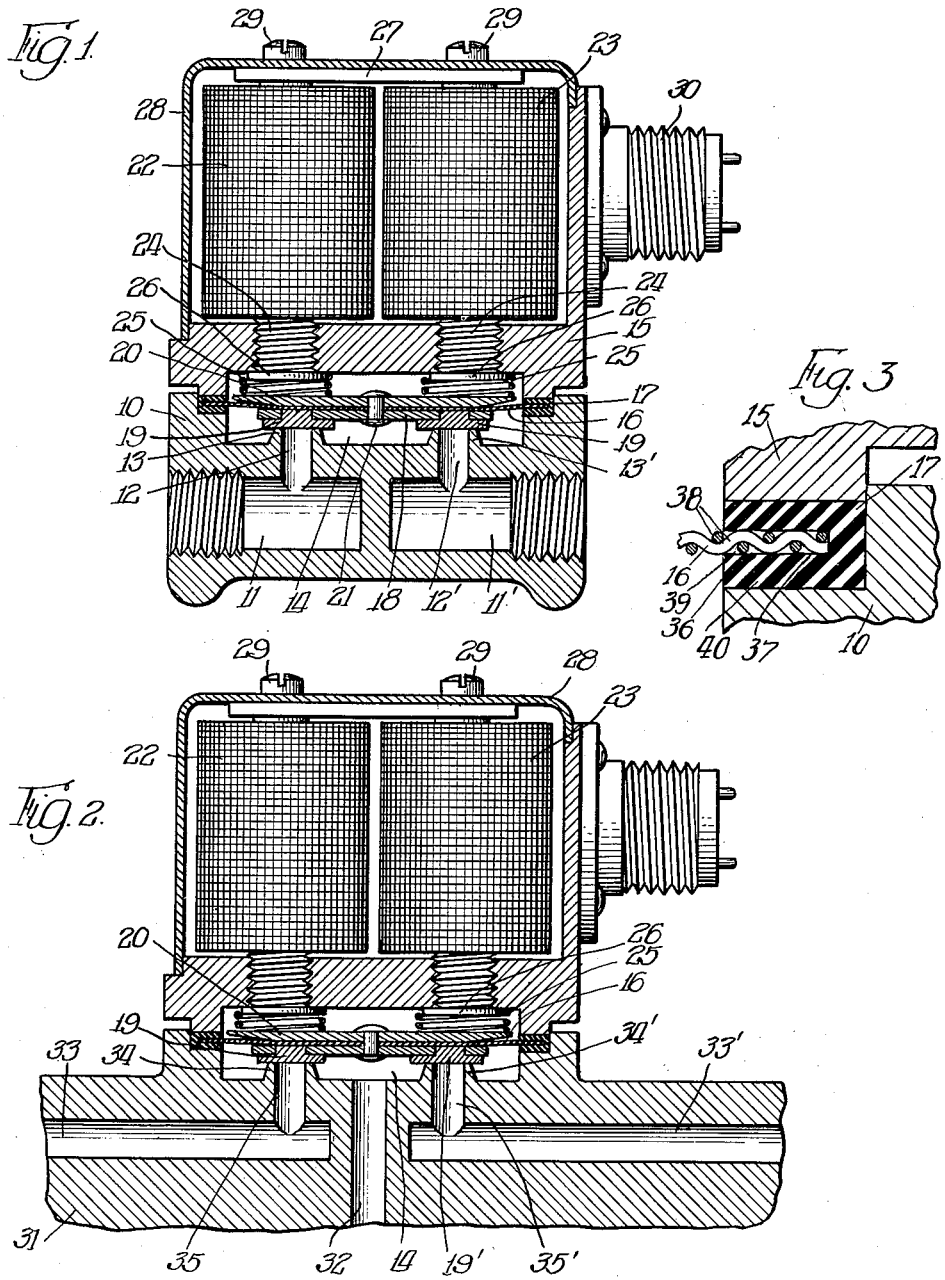

2,587,356

UNITED STATES PATENT OFFICE 2,587,356

REVERSIBLE VALVE STRUCTURE

Hal W. McPherson, Chicago, Ill., assignor, by mesne assignments, to The Skinner Chuck Company, a corporation of Connecticut Application July 16, 1945, Serial No. 605,396

4 Claims. (Cl. 137—139)

This invention relates to an electromagnetically operated fluid flow control valve of reversible character whereby instantaneous control in either direction of flow of the fluid is accomplished.

It is a primary object of the invention to provide a small and compact reversible valve of the character described which is exceedingly simple and inexpensive, requiring little manufacturing accuracy of dimension or tolerance, other than in the proportioning of the size of valve ports for the desired rate and capacity of flow.

It is a further object to provide a reversible valve of the flexible diaphragm type, in which pressure on the opposite sides of the diaphragm is balanced at all times, thereby minimizing the force required to overcome fluid pressure in controlling the operation of the valve.

A still further object is to provide a reversible, double ported, flexible diaphragm valve structure of the type described having an electromagnet operating device, all of a very compact and inexpensive construction.

Yet a further object is to provide a valve which is functionally symmetric in the arrangement of its valve instrumentalities, hence capable to control of flow of fluid in either direction, and in which the pressure of flow in either direction assists in operating the valve.

A still further and more specific object is to provide a valve structure of the type described, including an improved diaphragm having pressure equalizing and self-sealing features.

The foregoing statements are indicative in a general way of the nature of the invention, but other and more specific objects will be apparent to those skilled in the art upon a full understanding of the construction and operation of the device.

Two embodiments of the invention are presented herein for the purpose of exemplification, but it will be appreciated that the invention is susceptible of incorporation in other modified forms coming equally within the scope of the appended claims.

In the drawings:

Fig. 1 is a view in longitudinal vertical section through a valve structure incorporating the principles of the invention, embodied as a direct-acting reversible valve;

Fig. 2 is a view in longitudinal vertical section, illustrating the device of the invention incorporated as a reversible flow operator or pilot for a main control valve; and Fig. 3 is an enlarged view in transverse vertical section illustrating details of an improved diaphragm mount, no particular effort having been made to preserve exact proportions.

Referring to Fig. 1 of the drawings, wherein I have illustrated one embodiment of the invention as a small, direct-acting valve, the reference numeral 10 designates a suitable base casting having reversible inlet-outlet passages 11, 11' cored therein and tapped for connection in a fluid flow line in which the passages 11, 11' are disposed as desired either at the upstream or downstream side. Passages 11, 11' open respectively through ducts 12, 12' and valve ports as seats 13, 13' to a fluid flow and pressure chamber 14 which is defined between the base casting 10 and an upper casting 15 suitably secured thereto.

A flexible diaphragm 16 is clamped peripherally between castings 10, 15, using gasket means 17, the diaphragm extending transversely of chamber 14 over seats 13, 13'. On one side thereof the diaphragm 16 carries a rigid supporting disk or plate 18 having resilient circular valve elements 19 mounted thereon for closing coaction with seats 13, 13'. On the other side thereof the diaphragm 16 carries an electromagnet armature 20, said armature being of lesser width than the outer limit of the diaphragm 16 which is exposed in chamber 14. Valve elements 19 are appropriately secured to plate 18 in any suitable fashion and the plate and armature are secured to the center of the diaphragm, as by a rivet or rivets 21. The armature 20 is preferably beveled on its periphery for free flexure of diaphragm 16.

Valve elements 19 are preferably formed of a resilient material resistant to deterioration in liquids to be handled by the valve, for example, of synthetic rubber in the event the valve is used to handle hydrocarbon fuel. The diaphragm 16 is preferably fabricated of a porous fabric material permeable to the fluid or liquid handled by the valve and resistant to deterioration thereby. Nylon serves well for this purpose. However, other fabrics, treated or untreated, will also serve.

Casting 15 serves as a supporting base for a pair of similar electromagnets 22, 23, the poles 24 of which are threaded into the casting at points in vertical alignment with the respective seats 13, 13' and valve elements 19 therefor. Coil springs 25 centered on the heads or pole pieces 26 of these poles and engageable with the near side of armature 20 normally urge the diaphragm and valve elements 19 toward closing position of said elements relative to seats 13, 13'.

The electromagnets 23 have the opposite ends of the poles thereof connected by a cross bar or tie bar 27 of electromagnet material. The electromagnet assembly is housed in a sheet metal casing 28 held in place by screws 29 which are threaded in the upper ends of the electromagnet poles 24. The reference numeral 30 designates a plug-in type fitting by which the coil leads of the electromagnets 22, 23 are connected in an energizing or de-energizing circuit by a suitable switch, not shown, preferably of the instantaneous type. Details of various embodiments of a highly desirable electromagnet circuit are illustrated and described in my copending application Serial No. 605,395, filed July 16, 1945, now abandoned.

In the above described embodiment, a valve structure of the normally closed type is illustrated, i. e., in which, when the electromagnets 22, 23 are demagnetized as described in the above entitled copending application, the valve elements 19 are held closed by the springs 25. When the magnets 22, 23 are magnetically energized, armature 20 is attracted and the valves 19 unseated. As fully described in the above entitled application, I provide that this condition may be maintained, even though the flow of energizing current to the electromagnets is interrupted, but without positive demagnetization of the poles.

Assuming the valve elements 19 are unseated, flow through the valve takes place in one direction or the other, depending upon which is the upstream side of the fluid pressure head. During this time the permeable character of the diaphragm 16 permits equalization of fluid pressure on both sides of the diaphragm; hence, when the electromagnets 22, 23 are demagnetized to nullify the tractive effort thereof, the springs 25, assisted by the pressure built up on the rear of the diaphragm structure, shift the valve elements practically instantaneously into closing relation to seats 13, 13'. This relation is maintained effectively throughout the time of demagnetization, against all disturbing influences; the holding pressure on the rear of the downstream valve of the diaphragm assembly is ample to counteract the fluid pressure in either duct 12, 12', and should the direction of flow be reversed or back pressure be built up on the discharge side, the valve elements 19 will still remain closed. In other words, regardless of the direction of flow, pressure assists in the seating of the valve elements of the downstream valve so that it will not be opened upon reversal of flow. That is to say only the downstream port of the two ports 12 and 12' will be pressure closed; the upstream port having higher pressure under its valve seat will transmit pressure to the valve chamber and that pressure exerted on the downstream valve element 19 will tend to keep the downstream port closed. This, of course, is in addition to the force exerted by the spring.

In Fig. 2 I illustrate the device applied as an operator or pilot valve for a reversible flow, main diaphragm valve, generally designated 31, of the type shown and described in McPherson Patent No. 2,407,761 of September 17, 1946.

In this modification it is the purpose of the operator or pilot structure (which consists of elements similar in all respects to the elements shown in Fig. 1, hence similarly designated) to control the flow of liquid from a central pressure chamber of the main valve 31 (not shown) through a vertical bleeder passage or duct 32 to relief passages 33 or 33'. In accomplishing this function, the operator controls the fluid pressure behind a main valve carrying diaphragm (as fully illustrated and described in said Patent No. 2,407,761) and enables reversible flow controlling operation thereof.

To the above end the valve 31 is provided with seats 34, 34' with which the valve elements 19, 19' coact respectively, said seats communicating outwardly of bleeder duct 32 and through ducts 35, 35' with the relief passages 33, 33'. When diaphragm 16 is in elevated seat-exposing position, fluid flows through duct 32, valve seat 34 or 34', duct 35 or 35', and passage 33 or 33', in accordance with the side of the main valve body 31 on which the higher pressure exists, thereby dropping the pressure in the main valve behind its diaphragm, all as described in said Patent No. 2,407,761.

The diaphragm 16, being permeable to fluid, enables pressure to be built up on the rear side of the downstream valve thereof, to resist undesired opening of the valve elements 19 until the electromagnets 22, 23 are energized to exert desired tractive effort on armature 20.

From the foregoing, it will be apparent that structures of Figs. 1 and 2 afford, respectively, a valve which is direct-acting in a fluid line to control the flow in either direction therein, and an operator or pilot which is effective in regulating the action of a further main valve, regardless of the side of said main valve on which the pressure head exists. In the former case the seats 13, 13' are interchangeably operative as inlet or outlet ports, while in the embodiment specifically shown and described in Fig. 2 the seats 34, 34' are selectively available as bleeder passages in one direction or the other. However, in either case the function of diaphragm 16 and associated electromagnetic and mechanical elements is similar and is effectively operative regardless of the direction of discharge flow.

Either of the above embodiments incorporate by preference the improved diaphragm mounting structure which is illustrated in Fig. 3, representing a magnified sectional view of the diaphragm 16 and gasket 17 which are clamped between the castings 10, 15. In the form illustrated, the gasket comprises an annular rim 36 of inturned U-shaped cross section, fabricated of rubber, synthetic rubber, or other appropriate resiliently yieldable material. The fabric diaphragm 16 is received at its periphery in the annular channel 37 defined by the rim 36, the flanges 40 of said rim being capable of being spread for the reception of the fabric. Fig. 3 illustrates, in exaggerated section, the fibrous strands 38 and the interstices 39 of substantial relative size between said strands. The thus assembled rim and fabric are disposed in place between the castings, which are thereafter clamped together. In the operation of the device, the pressure existing in chamber 14 exists in said interstices 39 in rim 36 and, being equalized fully in the channel 37, tends to thrust the flanges 40 in opposite directions against the respective castings 10, 15 and, to this extent, improves the sealing characteristic of the diaphragm mounting. This affords a very simple, yet highly effective, self-sealing diaphragm for a device of the type under consideration.

In general, a simple reversible valve structure is provided by this invention which is not necessarily reliant on accurately ground surfaces, hence is very inexpensive to manufacture; which employs the pressure of the fluid handled to assist in its operation and insure against failure of operation; which is reliable and unfailing within a relatively large range of pressures, with many types of fluid, and in practically any conditions of temperature reasonably to be encountered; and which is small, compact and light in weight. By reason of these features the structure is particularly adaptable to the requirements of aircraft operating devices and controls, being operable with an unreliably regulated voltage source.

In the above description, reference has been made to the possible use of one of several embodiments of a positive magnetizing and demagnetizing circuit such as are described in my application Serial No. 605,395. However, any desired circuit may be availed of which provides adequate tractive force to draw the valve from seat covering (or seat closing) position when desired.

I claim:

1. A valve adapted to control fluid flow in either direction therethrough comprising means defining a chamber and a pair of ports each terminating in a valve seat in said chamber, said ports being adapted to coact interchangeably such that when either one comprises an inlet port the other comprises an outlet port, valve means comprising a flexible fluid permeable diaphragm of woven material extending across said chamber and having affixed thereto a pair of valve heads each coacting with one of said valve seats for opening and closing said ports whereby fluid pressure established within said chamber by the inlet port will tend to hold the valve head coacting with the valve seat of the outlet port in port closing relation to said outlet port, and means for actuating said valve comprising means for moving said heads into and out of engagement with said seats.

2. A valve as in claim 1 in which said last-mentioned means includes resilient means normally biasing said valve heads to port closing relationship with said seats.

3. A valve as in claim 2 in which said last-mentioned means includes electromagnetic means for withdrawing said valve heads from port closing relationship with said seats to open said ports.

4. A valve adapted to control fluid flow in either direction therethrough comprising means defining a chamber and a pair of ports each terminating in a valve seat in said chamber, said ports being adapted to coact interchangeably such that when either one comprises an inlet port the other comprises an outlet port, valve means comprising a flexible fluid permeable diaphragm of woven material extending across said chamber and having affixed thereto an armature and a pair of valve heads of resilient material coacting with one of said seats for opening and closing said ports whereby fluid pressure established within said chamber by the inlet port will tend to hold the valve head coacting with the outlet port seat in port closing relation to said outlet port, springs within said chamber normally biasing said armature and valve heads toward said seats to close said ports, and electromagnetic means for withdrawing said armature and valve heads from said valve seats to open said ports.

HAL W. McPHERSON.

REFERENCES CITED

The following references are of record in the file of this patent:

UNITED STATES PATENTS

| Number | Name | Date |
| --- | --- | --- |
| 343,642 | Kissell | June 15, 1886 |
| 570,727 | Gale | Nov. 3, 1896 |
| 602,548 | Williams | Apr. 17, 1898 |
| 763,054 | Gamble | June 21, 1904 |
| 896,120 | Kramer | Aug. 18, 1908 |
| 980,260 | Hodgkinson | Jan. 3, 1911 |
| 1,719,105 | Reaney | July 9, 1929 |
| 2,270,259 | Burke | Jan. 20, 1942 |
| 2,283,369 | Jacobsen | May 19, 1943 |
| 2,335,312 | Rotheim | Nov. 30, 1943 |
| 2,339,353 | Ray | Jan. 18, 1944 |
| 2,358,828 | Ray | Sept. 26, 1944 |
| 2,382,664 | Ray | Aug. 14, 1945 |
| 2,394,105 | Rice | Feb. 5, 1946 |
| 2,461,772 | Ray | Feb. 15, 1949 |

FOREIGN PATENTS

| Number | Country | Date |
| --- | --- | --- |
| 9,154 | Great Britain | of 1896 |
| 731,300 | France | of 1932 |